(12) United States Patent
Stewart

(10) Patent No.: US 12,433,257 B2
(45) Date of Patent: Oct. 7, 2025

(54) BEEHIVE SOLAR HEATER

(71) Applicant: Steven Ren Stewart, Mapleton, UT (US)

(72) Inventor: Steven Ren Stewart, Mapleton, UT (US)

(*) Notice: Subject to any disclaimer, the term of this patent is extended or adjusted under 35 U.S.C. 154(b) by 187 days.

(21) Appl. No.: 17/956,546

(22) Filed: Sep. 29, 2022

(65) Prior Publication Data
US 2023/0276774 A1 Sep. 7, 2023

Related U.S. Application Data

(60) Provisional application No. 63/308,192, filed on Feb. 9, 2022.

(51) Int. Cl.
*A01K 47/06* (2006.01)
*A01K 51/00* (2006.01)

(52) U.S. Cl.
CPC ............. *A01K 47/06* (2013.01); *A01K 51/00* (2013.01)

(58) Field of Classification Search
CPC .................................. A01K 47/06; A01K 51/00
See application file for complete search history.

(56) References Cited

U.S. PATENT DOCUMENTS

| | | | | |
|---|---|---|---|---|
| 3,994,034 A * | 11/1976 | Van Damme | .......... | A01K 47/06 449/12 |
| 4,068,652 A * | 1/1978 | Worthington | ......... | F24S 10/504 126/633 |
| 4,100,914 A * | 7/1978 | Williams | ................ | F24S 20/66 126/631 |
| 4,233,961 A * | 11/1980 | Kelly | ...................... | F24S 60/10 126/646 |
| 4,287,878 A * | 9/1981 | Holley | .................... | F24S 23/70 126/674 |
| 4,300,532 A * | 11/1981 | Olsen | ...................... | F24S 10/25 126/714 |
| 4,327,795 A * | 5/1982 | Wheeler | ................... | E06B 3/28 160/98 |
| 4,483,031 A * | 11/1984 | Shaparew | ............. | A01K 47/06 449/14 |
| 4,494,528 A * | 1/1985 | Horton | .................... | F24S 23/77 449/12 |
| 5,575,703 A * | 11/1996 | Stearns | .................. | A01K 47/06 449/13 |
| 6,912,816 B2 * | 7/2005 | O'Leary | ................. | F24S 20/67 126/621 |
| 10,775,058 B2 * | 9/2020 | Tyagi | ..................... | F24S 10/30 |
| 11,129,370 B1 * | 9/2021 | Shaw | ..................... | A01K 51/00 |
| 11,744,232 B2 * | 9/2023 | Waring | .................. | A01K 47/06 449/2 |

(Continued)

*Primary Examiner* — William L Gmoser

(57) ABSTRACT

The present invention comprises a novel beehive solar heater which can be incorporated into any Langstroth style hive (square boxes) easily for the winter season. It is attachable and detachable. No modifications, meaning permanent physical changes to the hive are required. Winter, and the stress due to cold, is the number one killer of beehives in the United States. This novel beehive solar heater, which is easily installed onto a beehive, can eliminate most of the stress that cause hives to die in colder winter regions. It will reduce or eliminate moisture in the beehive and provide the heat necessary for the bees to relocate their cluster to find feed as required.

20 Claims, 6 Drawing Sheets

(56) References Cited

U.S. PATENT DOCUMENTS

| | | | | |
|---|---|---|---|---|
| 2008/0064298 | A1* | 3/2008 | Junqueira de Souza | A01K 51/00 449/2 |
| 2013/0273808 | A1* | 10/2013 | Al Khazim Al Ghamdi | A01K 47/06 449/13 |
| 2014/0134920 | A1* | 5/2014 | Linhart | A01K 47/06 449/2 |
| 2016/0212976 | A1* | 7/2016 | Bulanyy | A01K 47/06 |
| 2020/0323177 | A1* | 10/2020 | Drennan | A01K 1/0047 |
| 2021/0400925 | A1* | 12/2021 | Harvey | A01K 47/06 |

\* cited by examiner

BEEHIVE SOLAR HEATER

FIELD OF THE INVENTION

This invention relates to the attachment of a solar heater to the beehive during the coldest winter months.

BACKGROUND

The Winter season is the hardest season of the year to keep beehives alive. In fact, "winter kill" is the number one cause of bee colony loss (death) in colder climates such as North America. Commercial or hobby beekeeping involves tending bees in beehives. Cold has a severe effect on beehives.

If the beehive can be warmed periodically when the sun is shining, as with a solar heater, bees will have the opportunity to break cluster. A winter cluster of bees forms inside the hive when the air temperature drops below 10 to 14 degrees C. (50 to 57 F), and the bees cling tightly together on the combs of the hive. The problem arises when the honey is exhausted where the cluster is located. The cluster must break apart for the bees to move to a new location for food. If they cannot do this due to continued low temperatures, they will die due to starvation, often with honey less than one inch away from the cluster. With a solar heater the temperature in the hive can be elevated to allow bees to move to a new locations inside the hive, even if the outside temperature remains very cold. All that is needed is a sunny day and the colony is saved.

Dampness in the beehive due to bee respiration is unavoidable. High moisture, meaning dampness, will form during the winter months and can cause the bees to become weak and limit their ability to stay warm. Water can form on the lid of the hive and drip onto the cluster. Water is also a major cause of bee colony loss (death) in the winter months. A solar heater will bring warm dry air into the hive to evaporate any standing water and lower the humidity thus increasing the hives ability to stay warm.

BRIEF SUMMARY OF THE INVENTION

This invention attaches a solar heater to a Langstroth style beehive (square box), which is the most common style beehive used around the world. No modifications need to be made to the hive as it can be attached between any sections of the hive, bottom, middle or top. This solar heater will only be attached when needed in the colder winter months. Warm air heated by the sun enters the beehive through the attached heater passively by convection only. Inside the beehive, convection will take the warmer air to the highest area, where the bees in cold weather are most commonly found. This warm air will circulate starting at the top of the hive and force the heavier cold air to exit at the bottom which is the hive entrance. This warm air will evaporate any standing water and lower the humidity of the hive. It will also provide heat allowing bees to relocate their cluster as needed. The heater is composed of a dark surface heated by the sun, which is protected from the wind and cold by a channel mainly composed of a clear, meaning see though, covering. There is an opening at the bottom of the solar heater which allows air to flow in as the warm air exits the top and into the hive.

An apparatus or method can be configured to perform particular operations or actions by virtue of having a combination of members and hardware that in operation causes or cause the apparatus or method to perform the actions. One or more apparatus can be configured to perform particular operations by virtue of including apparatus member that, when executed by the method, cause the apparatus to perform the actions. One general aspect includes a beehive warmer. The beehive also includes a mounting bracket configured to mount to a beehive; a panel extending from the mounting bracket where the panel may include a conduit configured to transport gas from the panel through the mounting bracket and into a beehive. Other embodiments of this aspect include a beehive warmer apparatus and methods for the same, each configured to perform the actions of the methods.

Implementations may include one or more of the following features. The beehive warmer where the mounting bracket may include a frame configured to stack in a modular hive. At least one frame member may include a gas-permeable screen configured to prevent bees from passing from the beehive into the panel. Each mounting bracket member may include a screen and a removable cover to allow the warmer to be selectively mounted on any member without disassembling the modular hive. The attachment frame is connected to the energy collection panel by a covering manifold configured to collect gas from the energy panel and direct the gas through the mounting bracket member and into the beehive. The covering manifold is at the top of the panel and configured to allow warmed air to rise from the panel and pass through the screen into the beehive. The panel further may include a chamber, a frame, a transparent cover, an energy collection surface, and an insulator where the frame, the transparent cover and the insulator form a chamber and the energy collection surface is configured to heat up in sunlight, warm the ambient gas, and where conduit is configured to conduct the heated gas through from the chamber into the beehive. The chamber is at least partially sealed. The energy collection surface is color optimized to absorb light energy. Implementations of the described techniques may include hardware, apparatus, a method or process.

One general aspect includes a frame configured to mount to a modular beehive; and a panel pivotally connected to the frame where the panel may include an at least partially encapsulated gas chamber. Other embodiments of this aspect include corresponding members, apparatus each configured to perform the actions of the methods.

One general aspect includes the beehive warmer where the panel may include a cover. Other embodiments of this aspect include corresponding computer systems, apparatus, and computer programs recorded on one or more computer storage devices, each configured to perform the actions of the methods.

One general aspect includes the beehive warmer where the panel further may include a panel frame. Other embodiments of this aspect include apparatus configured to perform the actions of the methods.

One general aspect includes the beehive warmer where the frame may include a chase way configured to place the gas chamber in gaseous communication with a screen in the frame. Other embodiments of this aspect include apparatus each configured to perform the actions of the methods.

One general aspect includes the beehive warmer where the panel further may include an insulator layer. Other embodiments of this aspect include corresponding apparatus configured to perform the actions of the methods.

One general aspect includes the beehive warmer where the panel further may include an element within the gas chamber. Other embodiments of this aspect include corresponding apparatus configured to perform the actions of the method.

One general aspect includes the beehive warmer where the element is configured to optimize the solar-thermophotovoltaic properties selected from the group may include of material. Other embodiments of this aspect include corresponding apparatus configured to perform the actions of the methods.

One general aspect includes the beehive warmer where the panel may include a plurality of layers with different solar-thermophotovoltaic properties. Other embodiments of this aspect include corresponding apparatus configured to perform the actions of the methods.

One general aspect includes a method of passively heating a beehive. The method of passively heating also includes coupling a gas chamber to a beehive; heating gas in the chamber using sunlight and channeling the heated gas from the gas chamber and into the beehive. Other embodiments of this aspect include corresponding apparatus configured to perform the actions of the methods.

One general aspect includes screening the heated gas. Other embodiments of this aspect include corresponding apparatus configured to perform the actions of the methods.

One general aspect includes at least partially encapsulating the gas chamber and directing the heated gas into the beehive through a conduit formed in the chamber. Other embodiments of this aspect include corresponding apparatus configured to perform the actions of the methods.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," an," and "the" are intended to include the plural forms as well as the singular forms, unless the context clearly indicates otherwise. It well be further understood that the terms "comprises" and/or "comprising," when used in the specification, specify the presence of the stated features, steps operations, elements, and/or components, but do not preclude the presence or addition of one or more other features, steps, operations, elements, components, and/or groups thereof.

The present disclosure is to be considered as an exemplification of the invention and is not intended to limit the invention to the specific embodiments illustrated by the figures or description below.

Figure 1:
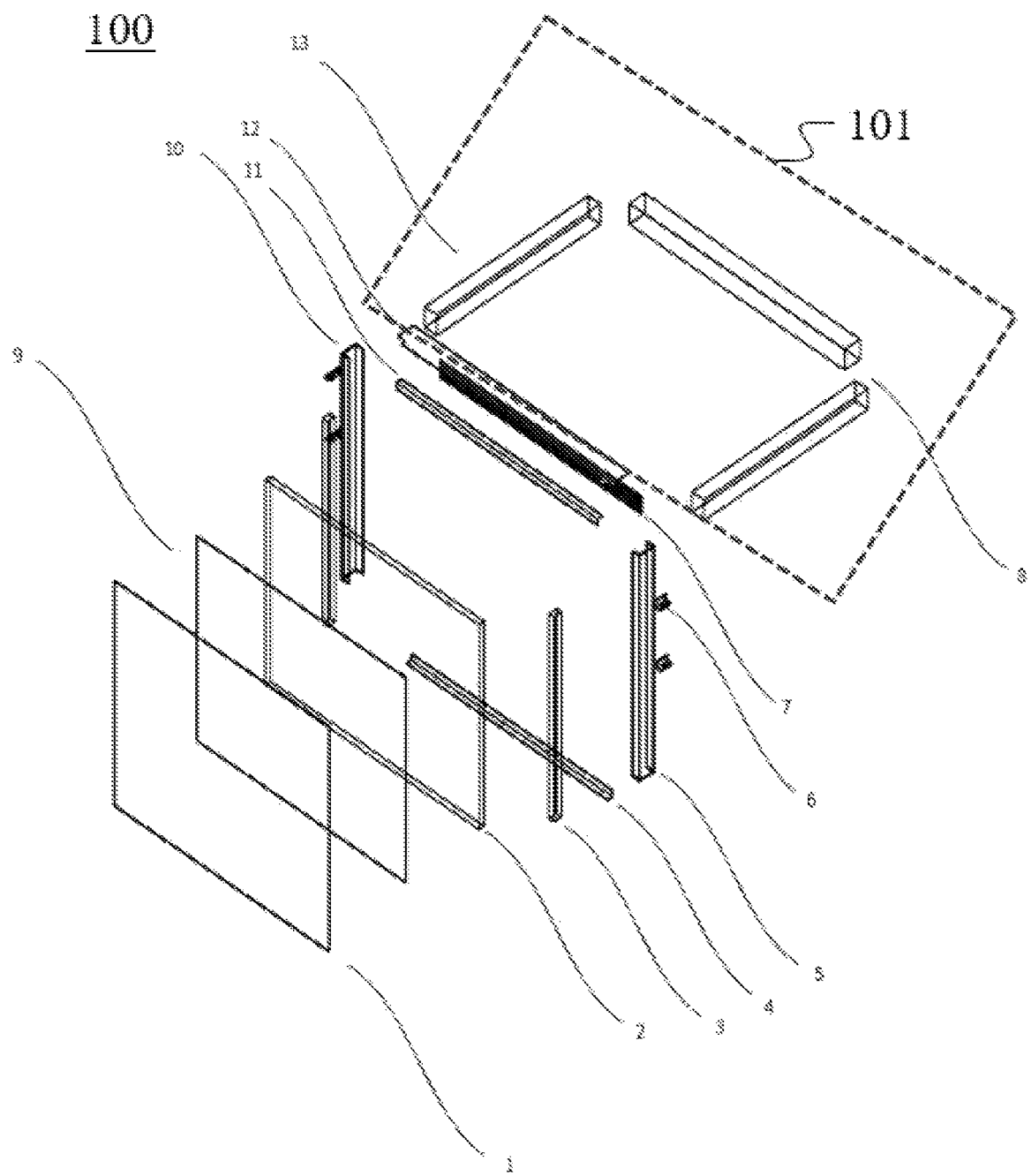
FIG. 1 depicts an exploded perspective view of the beehive solar heater according to various embodiments of the present invention.

The present invention will now be described by referencing the appended figures representing preferred embodiments. FIG. 1 depicts an exploded perspective view of the elements that may compromise a beehive solar heater. In the preferred embodiments, item 1 represents the clear covering to allow solar radiation to pass through to item 9 which is a black surface usually composed of but not limited to metal, to absorb this solar radiation. The purpose of item 1 as represented is to contain any heated air in the solar heater and shield it from wind and ambient temperatures. Item 2 represents a sheet of insulative material to shield the back side of item 9, and shield item 9 from ambient temperatures. This insulative material, item 2, allows item 9 to reach the maximum temperature possible from solar radiation.

The frame of the solar heater is composed of items 5, 10, 4 and 11 which are two cross bars and two side channels. Items 5 and 10 not only provide structure to hold other elements but are also configured to form a channel for air to pass through. As item 9 is heated from solar radiation, the immediate air contacting it is also heated. By convection, the warm air rises to the top of the solar channel. Item 12 compromises a clear covering of the top of the solar heater to stop warm air from escaping to the outside. Warm air passes through item 7 which is a screen material. This screen material provides the opening for the heated air to enter the beehive. This screen, item 7, will keep bees from trying to enter the solar heater as warm air enters the hive.

Figure 2:
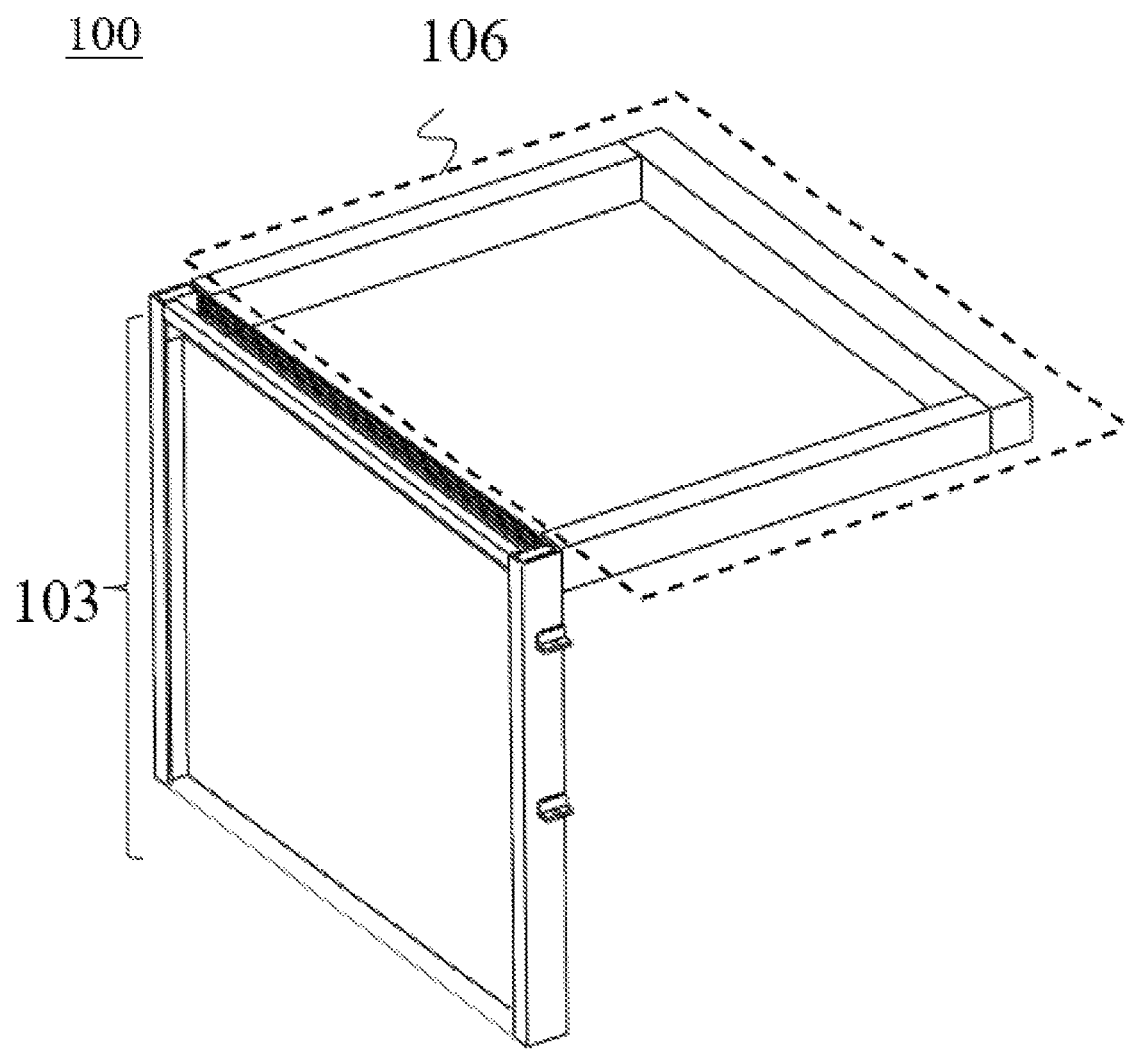
FIG. 2 illustrates a perspective view of a Beehive Solar Heater.
Figure 3:
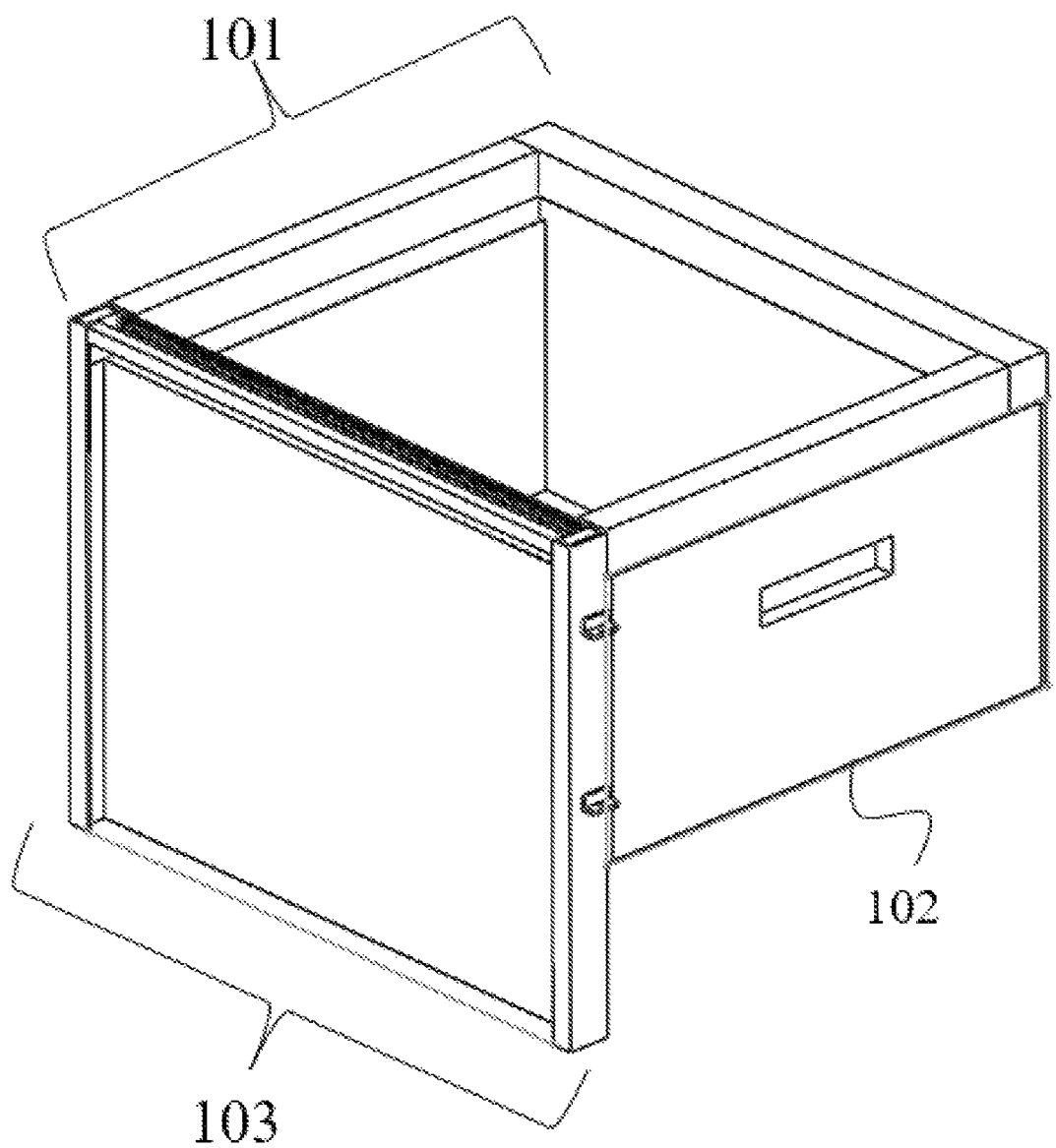
FIG. 3 illustrates a perspective view of a beehive solar heater placement on a Langstroth sample beehive box.
Figure 4:
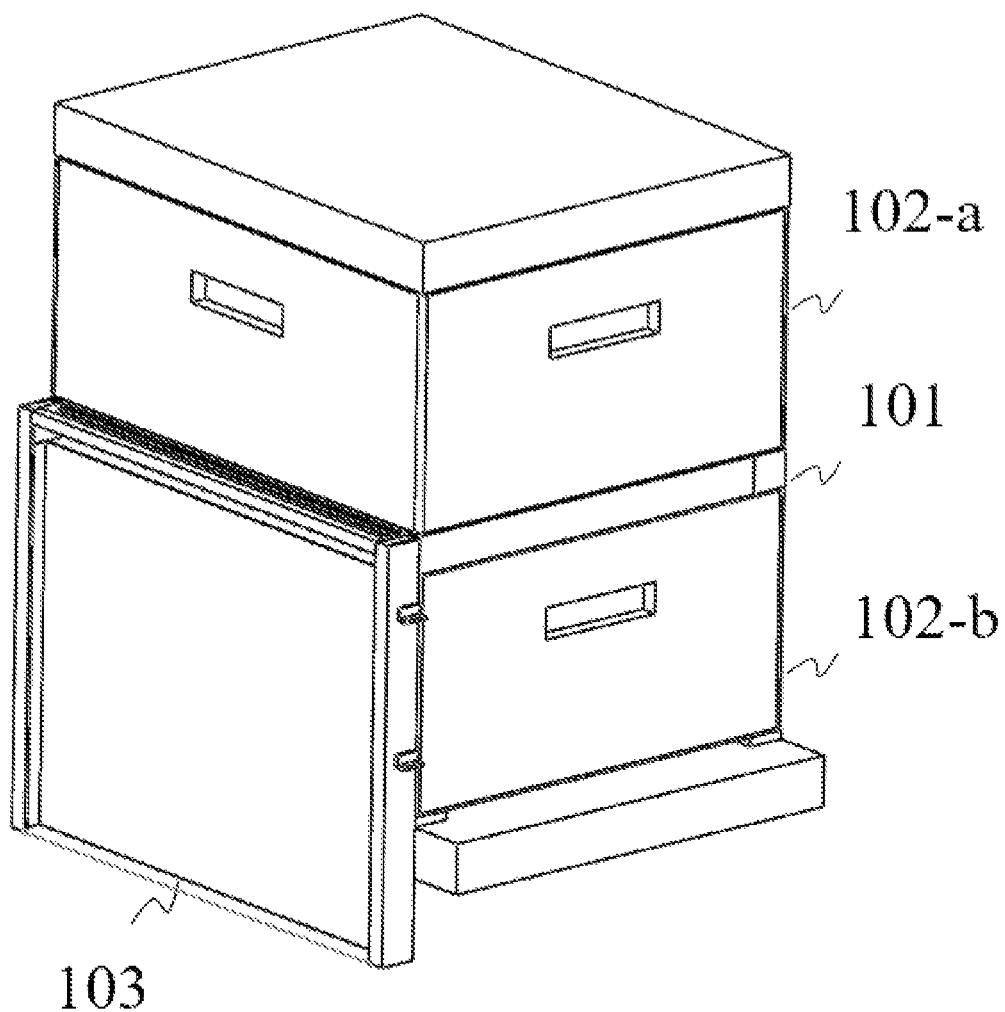
FIG. 4 illustrates a perspective view of a beehive solar heater device positioned in between two sample beehive boxes. In this example the beehive is required to be elevated to allow placement of the solar heater.
Figure 5:
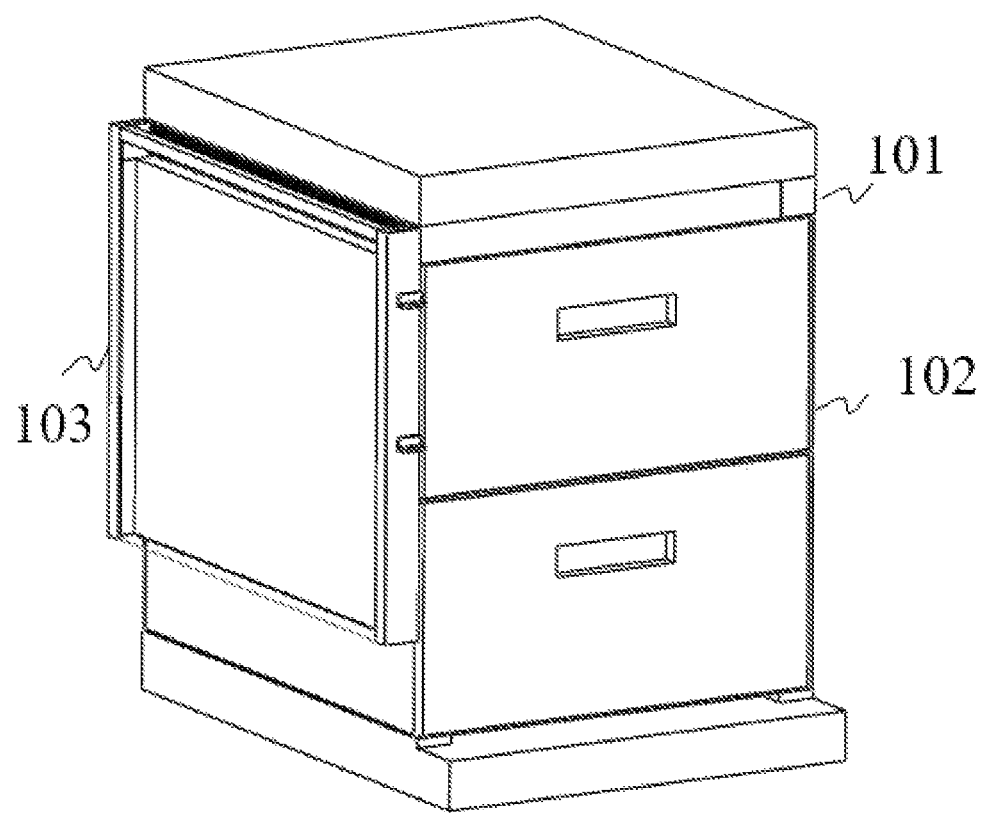
FIG. 5 illustrates a perspective view of a beehive solar heater device positioned on the top box of an example beehive and underneath the lid.
Figure 6:
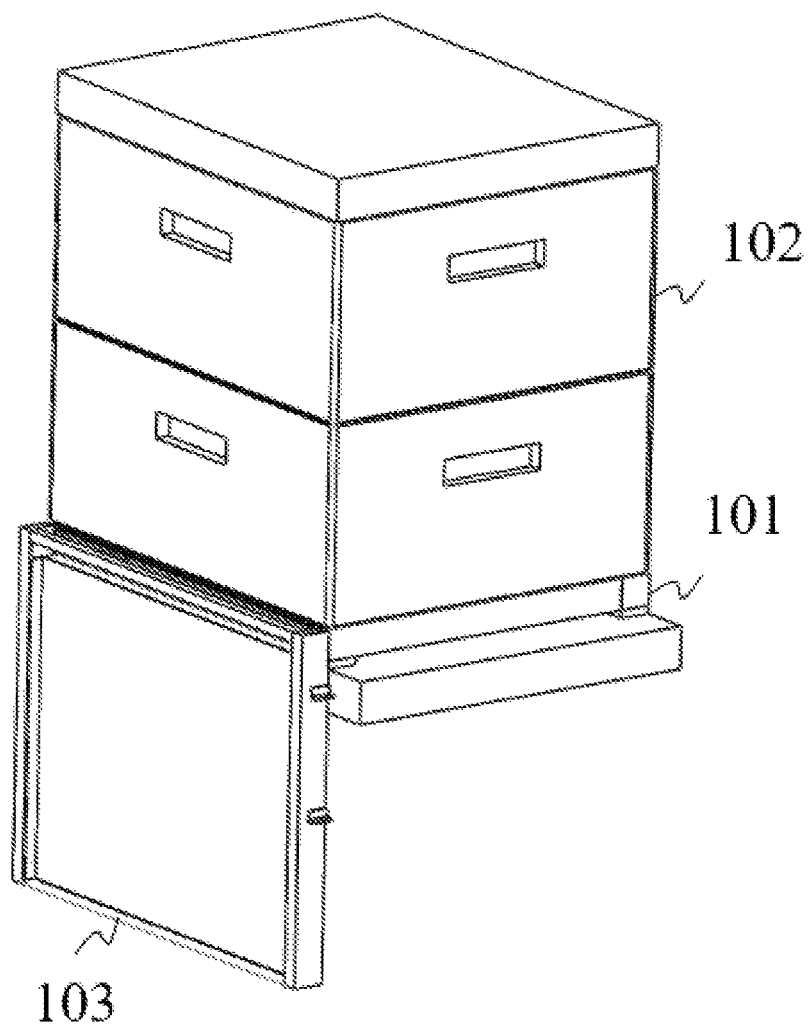
FIG. 6 illustrates a perspective view of a beehive solar heater device position at the bottom of an example beehive and on top of the hive entrance. In this example the beehive is required to be elevated to allow placement of the solar heater.

Items 13, and item 8 represent a frame attached to the solar heater. This frame is placed between two beehive boxes, 102-a and 102-b in FIG. 4, or between any parts of the hive including the base and the lid, as shown in FIGS. 5 and 6. The purpose of this frame is to allow a space where heated air from the solar heater can enter the hive. This is important as no modification to any part of the beehive is required in order to use this solar heater. FIG. 2 shows the assembled solar heater. How this novel solar heater is use used with parts of the beehive are demonstrated in FIGS. 3, 4, 5 and 6.

The purpose of this invention is help bees survive the winter season. This is achieved by the introduction of warm dry air to the inside of the hive. The warm dry air provides two critical functions:

1. evaporates water while lowering the humidity,
2. provides sufficient heat for the bees to find new honey, when the honey under the cluster is all consumed.

These two critical functions necessary for survival have been sought out by beekeepers in colder winter areas around the world no real good answer has yet surfaced. This novel yet simple beehive solar heater achieves easily both of these functions.

Referring now to FIGS. 1-6, in some embodiments a beehive warmer 100 is taught. In some embodiments a mounting bracket 101 is configured to mount to a beehive 102. In some embodiments a panel 103 extends from the mounting bracket 101. In some embodiments the panel 103 comprises a conduit configured to transport gas from the panel into the beehive 102. In some embodiments the gas passively transfers from the panel 103 to the beehive 102.

In some embodiments the mounting bracket 101 comprises a mounting frame 106 configured to couple to the beehive 102.

In some embodiments the frame 106 further comprises a plurality of frame members 8, 13 wherein at least one frame member comprises a gas-permeable screen 7 configured to prevent egress of a bee from passing the beehive 102.

In some embodiments the beehive 102 is a modular beehive and wherein the mounting bracket 101 further comprises a removable cover 12.

In some embodiments the mounting bracket 101 is connected to the panel 103 by a covering manifold 12 configured to collect gas from the panel 103 and direct the gas into the beehive 102.

In some embodiments the covering manifold 12 is at a margin of the panel 103.

In some embodiments the panel 103 further comprises a chamber further comprising a panel frame 5, 10, 11, a transparent cover 12, an energy collection surface 9, and an insulator 2 wherein the panel frame 5, 10, 11, the transparent cover 12 and the insulator 2 form the chamber 107 and the energy collection surface 9 is configured to heat up in sunlight, warm an ambient gas in the chamber, and wherein the conduit is configured to conduct the ambient gas through the chamber into the beehive 102.

In some embodiments the chamber is at least partially sealed. In some embodiments the chamber heats ambient air using the heating element. In some embodiments the heated ambient transports by convection out of an opening in the at least partially sealed chamber. When the panel 103 is coupled to a beehive the heated ambient air is directed through the opening and into the beehive. In some embodiments every side of the panel is sealed except that side connected to the beehive. However, in some embodiments a second opening is provided on the back side of the panel to allow gas to flow through the panel. In some embodiments the second opening is an inflow opening and is covered with a gateway flap configured to prevent gas inflow.

In some embodiments the energy collection surface is optimized to absorb light energy. A beehive warmer 100 comprising a mounting bracket 101 configured to mount to a modular beehive 102; and a panel 103 pivotally connected to the mounting frame 106 wherein the panel comprises an at least partially encapsulated chamber.

In some embodiments the panel 103 comprises a cover 1.

In some embodiments the panel further comprises a panel frame 5, 10, 11.

In some embodiments the panel frame 5, 10, 11 comprises a chase way configured to place the chamber in gas communication with a screen 7 in the mounting bracket 101.

In some embodiments the panel 103 further comprises an insulator layer 2.

In some embodiments the panel 103 further comprises an energy collection surface 9 within the gas chamber.

In some embodiments the panel comprises a plurality of layers 1, 2, 3 with different solar-thermophotovoltaic properties.

In some embodiments the panel is configured to optimize the solar-thermophotovoltaic properties. In some embodiments the panel comprises material configured to optimally convert solar energy to heat. In some embodiments the panel comprises a color or colors or layers of colors configured to optimally convert solar energy to heat. In some embodiments the panel comprises material with a density that optimizes converting solar energy to heat. In some embodiments the panel comprises a shape or shapes that optimize the conversion of solar energy to heat. In some embodiments the panel comprises surface contours that optimize the conversion of solar energy to heat.

An alternative embodiment comprises a method of passively heating a beehive comprising coupling a gas chamber to a beehive. Some embodiments further comprise heating an ambient gas in the chamber using sunlight. Some embodiments further comprise channeling the heated gas from the gas chamber into the beehive.

Some embodiments of the method further comprise at least partially encapsulating the gas chamber. Some embodiments further comprise directing the heated gas into the beehive through a conduit formed in the chamber. In some embodiments the heated gas in the gas chamber moves by convection into the beehive to warm the inside of the beehive and allow bees to relocate inside the beehive. Some embodiments further comprise screening the gas chamber.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

What is claimed is:

1. A beehive warmer for reducing humidity inside a beehive comprising:
   a mounting bracket configured to mount to the beehive;
   a panel extending perpendicularly from the mounting bracket wherein the panel comprises a gas conduit between the panel and the beehive;
   a first side channel and a second side channel, the first and second side channels configured to conduct ambient air into the panel;
   wherein the ambient air located within the panel is heated using sunlight; and
   a covering manifold configured to direct the heated air from the panel through the beehive and exiting to the outside of the beehive, wherein the air evaporates moisture inside the beehive.

2. The beehive warmer of claim 1 wherein the mounting bracket comprises a frame configured to couple to the beehive.

3. The beehive warmer of claim 2 wherein the frame further comprises a plurality of frame members wherein at least one frame member comprises a gas-permeable screen configured to prevent egress of a bee from passing out of the beehive.

4. The beehive warmer of claim 3 wherein the beehive is a modular beehive and wherein the mounting bracket further comprises a removable cover.

5. The beehive warmer of claim 1 wherein the mounting bracket is connected to the panel by the covering manifold.

6. The beehive warmer of claim 5 wherein the covering manifold is at a margin of the panel.

7. The beehive warmer of claim 1 wherein the panel further comprises a chamber further comprising a frame, a transparent cover, an energy collection surface, and an insulator wherein the frame, the transparent cover and the insulator form the chamber and the energy collection surface is configured to heat up in sunlight, warm an ambient gas in the chamber, and wherein the conduit is configured to conduct the ambient gas through the chamber into the beehive.

8. The beehive warmer of claim 7 wherein the chamber is at least partially sealed.

9. The beehive warmer of claim 7 wherein the energy collection surface is optimized to absorb light energy.

10. A beehive warmer for reducing humidity inside a modular beehive comprising:
- a mounting bracket configured to mount to the modular beehive, the mounting bracket positioned between the modular beehive and a second beehive;
- a panel pivotally connected to the mounting bracket wherein the panel comprises an at least partially encapsulated gas chamber and the panel extends perpendicular to the mounting bracket;
- a first side channel and a second side channel, the first and second side channels configured to conduct ambient air into the panel;
- wherein the ambient air located within the panel is heated using sunlight; and
- a covering manifold configured to direct the heated air from the panel through the modular beehive and exiting to the outside of the modular beehive, wherein the air evaporates moisture inside the modular beehive.

11. The beehive warmer of claim 10 wherein the panel comprises a cover.

12. The beehive warmer of claim 10 wherein the panel further comprises a panel frame.

13. The beehive warmer of claim 12 wherein the panel frame comprises a chase way configured to place the gas chamber in gas communication with a screen in the mounting bracket.

14. The beehive warmer of claim 10 wherein the panel further comprises an insulator layer.

15. The beehive warmer of claim 10 wherein the panel further comprises an energy collection surface within the gas chamber.

16. The beehive warmer of claim 10 wherein the panel comprises a plurality of layers with different solar-thermophotovoltaic properties.

17. The beehive warmer of claim 16 wherein the panel is configured to optimize the solar-thermophotovoltaic properties selected from the group consisting of material, color, density, shape, surface contour, and a plurality of layers.

18. A method of passively heating a beehive comprising:
- coupling a gas chamber to a beehive;
- conducting ambient air into the gas chamber;
- heating the air in the gas chamber using sunlight; and
- channeling the heated air from the gas chamber into the beehive and exiting to the outside of the beehive, wherein the heated air displaces cooler air inside the beehive and evaporates moisture inside the beehive as the air exits the beehive.

19. The method of claim 18 further comprising at least partially encapsulating the gas chamber and directing the heated gas into the beehive through a conduit formed in the gas chamber.

20. The method of claim 18 further comprising screening the gas chamber.

* * * * *